United States Patent [19]
Mitra

[11] Patent Number: 5,909,547
[45] Date of Patent: Jun. 1, 1999

[54] METHOD FOR SHARED MEMORY MANAGEMENT IN NETWORK NODES

[75] Inventor: Debasis Mitra, Summit, N.J.

[73] Assignee: Lucent Technologies Inc., Murray Hill, N.J.

[21] Appl. No.: 08/736,149

[22] Filed: Oct. 24, 1996

[51] Int. Cl.$^6$ .................................................. G06F 17/00
[52] U.S. Cl. ............................... 395/200.43; 395/200.45
[58] Field of Search .................................... 370/230, 232, 370/235, 412, 415, 416; 395/200.43, 200.45

[56] References Cited

U.S. PATENT DOCUMENTS

| | | | |
|---|---|---|---|
| 5,457,679 | 10/1995 | Eng et al. | 370/16 |
| 5,528,587 | 6/1996 | Galand et al. | 370/60 |
| 5,541,912 | 7/1996 | Choudhury et al. | 370/17 |

OTHER PUBLICATIONS

A. Elwalid, et al., "Effective Bandwidth of General Markovian Traffic Sources and Admission Control of High Speed Networks," *IEEE Infocom '93*, pp. 256–264 (1993).

Schwartz, *Integrated Broadband Networks*, Ch. 5, pp. 181–242 (Prentice–Hall, New Jersey 1996).

A. Elwalid, et al. "A New Approach for Allocating Buffers and Bandwidth to Heterogeneous, Regulated Traffic in an ATM Node," *IEEE J. on Selected Areas in Communications*, vol. 13, No. 6, pp. 1115–1127 (Aug. 1995).

David E. McDysan, "ATM Theory and Application", pp. 321–322, 1994.

*Primary Examiner*—Ellis B. Ramirez

[57] ABSTRACT

The invention concerns a method for a multi-port node having a shared buffer memory to provide enhanced data packet buffering capacity for established virtual circuits (VC's) through the node and one of its output ports while maintaining grades of service commitments. The method admits incoming data packets to a node for an established VC based on a determination of combination of factors including the effective memory requirements for each output port as VC's are created or terminated, the portions of buffer memory in use for conveying packets through the intended output port for the incoming packet, and the total amount of available shared memory in the node. Such determinations enable the node to better decide whether admitting the incoming packet would cause a disproportionate allocation of the shared memory for the intended output port. As a consequence, a relatively high packet buffering capacity can be achieved substantially without violating grades of service commitments.

16 Claims, 3 Drawing Sheets

METHOD FOR SHARED MEMORY MANAGEMENT IN NETWORK NODES

FIELD OF THE INVENTION

The invention relates to network communication.

BACKGROUND OF THE INVENTION

Networks are a principal means of exchanging or transferring information, such as signals representing voice, audio, text or video, among communication devices. Such communication devices often include devices for sending and/or receiving information, such as computer terminals, multimedia workstations, facsimile machines, printers, servers and telephones. The exchange or transfer of information is referred to as a call or connection. Information transmitted on the network can be of many different forms but is often formatted into fixed-length packets or cells.

A network typically includes switching nodes having ports coupled by links to ports of other nodes and to the communication devices. Each link is uni- or bi-directional and is characterized by a bandwidth or link capacity in the directions of data transfer. Information to be exchanged is often conveyed over a path containing a set of nodes and links connecting two communication devices. The path can be regarded as a "virtual circuit" (VC) whereby one communication device specifies the intended destination for the information, and the network delivers the information as though a dedicated circuit connected the two communication devices.

Networks, such as broadband ISDN (BISDN) employing asynchronous transfer mode (ATM) packet switching, are increasingly being used for the reliable, high-speed transmission of information. This increased use has brought major changes in network architecture and infrastructure design as well as in network operations and/or in the classes of services offered over the network. Classes of services offered over a network can include, for example, video-on-demand and video teleconferencing. Moreover, particular classes of services, such as video teleconferencing, are relatively sensitive to routing delays and receive higher routing priorities than other service classes, such as video-on-demand, which are relatively delay insensitive.

In order to extract high revenues from a network, it is advantageous for network managers to operate the network at a relatively high call capacity, i.e., establishing and maintaining a large number of simultaneous VC's. Improvement in efficiency of allocating network resources, such as transmission capacity of the links and buffer memory space, among different classes of services is one method for enabling such high capacity. Buffer memories are typically employed in the nodes to increase the number of VC's carried by the node by buffering transmission of data cells that are relatively delay insensitive while buffering to a lesser extent transmission of those data cells that are relatively delay sensitive. Such buffer memories effectively operate as respective queues for the data packets that are to be conveyed through the respective ports.

Some data services provided by a network manager are based on a grade of service commitment. For example, a network manager and a network user may agree that each VC established for that user is to have a particular committed information rate (CIR), and/or maximum information loss probability. Thus, a quiescent user seeking to start up sending data over a VC expects to receive a grade of service almost immediately that corresponds to its CIR. An admission controller is often used to restrict the total number of VC's at each node, and to monitor the sums of the CIR's for the VC's that have been established. Admission controllers are generally described in A. Elwalid and D. Mitra, "Effective Bandwidth of General Markovian Traffic Sources and Admission Control of High Speed Networks," *IEEE INFOCOM '93*, pp. 256–264 (1993), which is incorporated by reference herein. Moreover, the CIR's can be based on, for example, the priority levels of data cells that are transmitted. Priorities of a data cell transmitted over an BISDN network are often assigned prior to transmission of the cell and indicated as a cell loss priority bit of an ATM data packet.

It is common for a VC to require bandwidth in excess of its CIR. Since many data sources often provide bursts of data instead of a relatively steady stream of data, a network typically maintains bandwidth and buffer memory in excess of the sum of the CIR's of the active VC's. As a consequence, it is generally desirable that the network manager be responsive in providing extra bandwidth or buffer memory resources to a VC, even if the amount required is in excess of the VC's CIR, provided that such resource provision can be done while meeting the CIR's for other established VC's. More specifically, the particular method chosen for allocation of shared buffer memory between multiple output ports in a multi-port node is important so as not to unfairly deny conveyance of data cells for one VC relative to conveyance of data cells for another VC. If a data cell transmitted over a VC is denied conveyance, it will undesirably not reach its destination communication device and be considered a lost data packet in the network.

Exemplary buffer memory management methods include the complete sharing of network resources among data cells conveyed over established VC's. However, in accordance with this technique, it is possible for data cells of one VC to disadvantageously overwhelm all others and use substantially all available buffer memory preventing data cells of other VC's from sharing such memory. Another sharing technique is complete partitioning which partitions the buffer memory based on respective data cell classes. Complete partitioning enables data cells destined for a respective node output port exclusive use of an allocated portion of buffer memory. However, unused portions of buffer memory assigned to one port may not be used by data cells destined for another port often resulting in a reduced allocation efficiency.

Dynamic thresholding (DT) is a shared memory allocation technique providing enhanced performance over the complete sharing and complete partitioning methods. The DT technique employs respective queues of data packets for each of the output ports of a multi-port switch. The permissible length for any of the individual queues at any instant in time is a function of unused shared buffer memory in the switch at that time. If admission by the switch of a received data packet that is destined for a particular output port would cause the queue for that port to exceed its permissible length, then admission of the data cell would be denied.

Since the permissible lengths of the queues are dynamically changed as data packets are conveyed through the output ports or added to the queues, the technique dynamically adapts to uncertain and changing load conditions. This technique improves fairness and efficiency by guaranteeing access to the buffer memory for all output queues and by preventing any single output queue from monopolizing the memory at the expense of the other queues. However, the technique does not allow the queue for a first output port for which established VC's are providing high traffic demand to exceed its determined length despite that the VC's of a second output port are providing low traffic demand leaving the corresponding queue partly unused.

Accordingly, a continuing need exists for buffer memory allocation methods providing even more enhanced efficiency in multi-port network nodes.

SUMMARY OF THE INVENTION

The invention concerns a method for a multi-port node having a shared buffer memory to provide enhanced packet buffering capacity for established VC's while maintaining grades of service commitments. In accordance with the invention, provisional allotments of the shared buffer memory are made for the respective ports such as, for example, based on effective memory requirements determined for VC's established through such ports. Then, the method evaluates whether to admit an incoming packet for an established VC for conveyance through an intended output port based on the substantially total available buffer memory not presently used for buffering packets in view of a reserved buffer amount. The reserved buffer amount is based on whether the admission of the incoming packet would make the provisionally allotted memory for that port overloaded or underloaded, and optionally, on the priority level of the incoming packet.

The provisionally allotted memory is considered underloaded if the memory space containing packets destined for that port in combination with the memory requirements of the incoming packet is less than or equal to the provisionally allotted memory amount for that port. The size of the reserved buffer amount is determined to protect the other ports that are underloaded such that when those ports become more active and require buffer memory up to their provisional allotment, such memory space is made available in a timely manner. Thus, the use of the reserved buffer amount enables the method to determine when additional memory can be allotted over the provisional allotment for a particular port without disadvantageously violating the grade of service associated with VC established through another port. Moreover, by allotting the provisional buffer memory for the ports based on effective memory requirements of established VC's as new VC's are created and established VC's are terminated, the method advantageously adapts the allotment of the shared buffer memory to more efficiently handle memory allotment accommodating ports having high and low data packet traffic.

Additional features and advantages of the present invention will become more readily apparent from the following detailed description and accompanying drawings.

DETAILED DESCRIPTION

The invention concerns a memory management and data packet admission method for a multi-port node having a shared buffer memory for providing enhanced data packet buffering capacity while maintaining grades of service commitments for established virtual circuits (VC's). Methods according to the invention can advantageously be employed in various different multi-port nodes and communication network configurations. However, the invention is described with respect to the network configuration of FIG. 1 and the multi-port node configurations of FIGS. 2 and 3 for ease of illustration which is not meant to be a limitation on the invention.

Figure 1:
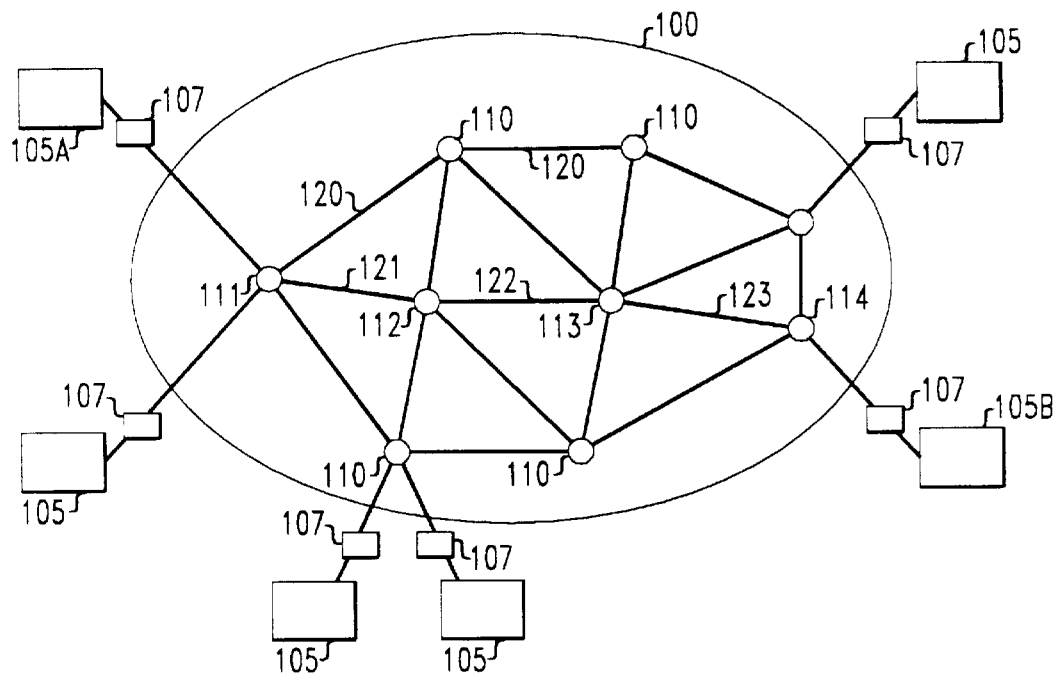
FIG. 1 illustrates a schematic block diagram of an exemplary network employing nodes operating in accordance with the invention.

An exemplary communication network 100 employing asynchronous transfer mode (ATM) packet switching, that includes at least one multi-port node 110 in accordance with the invention is shown in FIG. 1. Exemplary multi-port nodes configurations according to the invention are described in greater detail with respect to FIGS. 2 and 3. In FIG. 1, the network 100 contains communication links 120 coupling particular nodes 110. In a typical BISDN network, it possible for the number of links connected to a node 110 to be on the order of 512 or greater. Each link 120 possesses a respective capacity of data packets that can be conveyed over the link per unit of time which is typically referred to as the link's bandwidth. Exemplary links having bandwidths of approximately 622 MB/sec. have been used in conventional BISDN networks. Each multi-port node 110 includes a shared buffer memory useable for buffering data routed to respective links 120.

Data packets are units of data that are addressed with routing information. It is possible for the packets to be of fixed or variable length in accordance with the invention. Exemplary packets include ATM cells having a fixed length of 53 bytes. Also, packets in a higher protocol layer may have a longer length and are typically referred to as messages which can be subdivided to generate a plurality of cells for ATM switching.

It is possible for one or more of the nodes 110 to be located within a particular network switch, such as, for example, ATM data switches commercially available from Lucent Technologies Inc. of Murray Hill, N.J., including Lucent's GlobeView 2000 switches. Particular nodes 110 are further coupled to access regulators 107 which are coupled to communication devices 105. The communication devices 105 are typically employed by service providers and users to enable the users to request and obtain services such as, for example, video-on-demand or video conferencing. The access regulators 107 regulate the flow or rate of data packets from the communication devices 105 into the network 100 according to a function characterized by a set of access regulator parameters. It is possible for the access regulators 107 to be leaky bucket regulators, buffered leaky bucket regulators or cascaded leaky bucket regulators. The use of access regulators is typical in conventional BISDN networks, however, it is not critical to practicing the present invention. It is possible for the communication devices 105 to be directly coupled to the nodes 10 in FIG. 1 according to the invention.

Information provided to the network 100 from communication devices 105 is characterized by a set of information parameters, such as long term average transmission rate, peak transmission rate and maximum burst size. The value of each information parameter in the set of information parameters is based on a particular grade of service, for example, contracting terms with the network provider for a maximum cell loss rate and the corresponding appropriate access regulator parameters which can be, for instance, the rate at which data packets flow in the network 100. It is also possible for the particular grade of service to be based on priority levels of the packets.

A priority level is often assigned prior to transmission of the packet and is indicated in an ATM cell, for example, as a cell loss priority (CLP) bit. Typically, priority level is determined based on whether a data packet to be conveyed conforms to the contractual obligations. In the alternative, it is possible for the priority level to be based on the service class associated with information conveyed over the network 100 is based on the sensitivity of the destination communication device 105 to delay in receiving such information. In addition, the priority level can be based on a class of data in the packet. For instance, several different classes of data packets that can be transmitted in conventional ATM packet switching include constant bit rate (CBR) cells that are typically used for voice or audio data, real-time variable bit rate (real-time VBR) data for video data such as for video conferencing, non-real-time variable bit rate (non-real-time VBR) data for still picture data, available bit rate (ABR) data that is typically text that is relatively delay sensitive and unspecified bit rate (UBR) data. It is also possible for a packet to have an unspecified priority.

Communication devices 105 communicate with respective other communication devices 105 by a VC established over particular nodes 110 and links 120 in the network 100. More specifically, it is possible for information to be transferred between initiating and destination communication devices 105, by the initiating device 105 requesting a VC path for carrying the call to be established between the particular devices 105. For instance, one possible path to carry or route a call from a communication device 105A to a destination communication device 105B includes nodes 111, 112, 113 and 114 and links 121, 122 and 123.

The particular path chosen to route a VC through the network 100 requires that the included nodes 110 and links 120 have sufficient available buffer memory and link bandwidth to route such a VC at a data rate commensurate with any grade of service commitments such as guaranteed bandwidth or maximum information loss probability, made to endpoint users. Before the requested VC can be routed, the node buffer space and link bandwidth must be determined to choose a path with sufficient resources to meet such requirements. As in conventional nodes, it is possible for more than one VC to be established through a single output port of the node 110. The particular technique for establishing a VC is not critical to practicing the invention and it is possible to employ any of various techniques including, for example, such techniques disclosed in U.S. Pat. Nos. 5,519,836 and 5,502,816, which are assigned to the assignee of the present invention and incorporated by reference herein.

Figure 2:
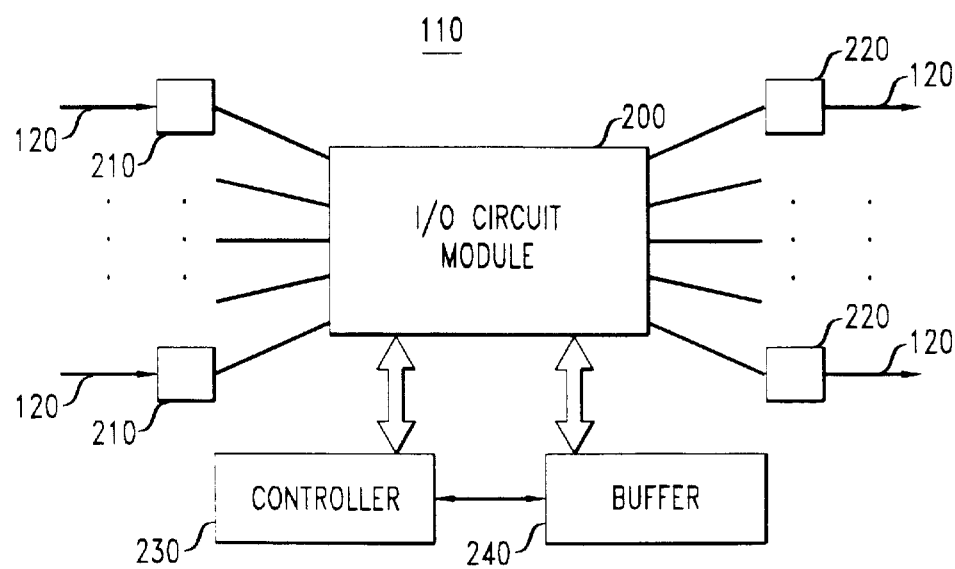
FIG. 2 illustrates a schematic block diagram of an exemplary node employed in the network of FIG. 1.

An exemplary multi-port node 110 useable with the invention is shown in FIG. 2. Exemplary components for the depicted node components in FIG. 2 can be those employed in the previously listed commercially available ATM data switches. The node 110 of FIG. 2 includes a plurality of input ports 210 and output ports 220 connected to respective network links 120 in FIG. 1. It is possible for the number of ports 210 and 220 to be on the order of hundreds. The ports 210 and 220 are further coupled to an input-output (I/O) circuit module 200 that is controlled by a controller 230. The controller 230 provides connection admission control (CAC) that responds to requests for establishing paths from particular input ports 210 to particular output ports 220 for providing a particular segment of a VC for conveying packets over the network 100. Each port 210 and 220 in the multi-port node 100 typically can route calls of at least one specific priority level. The controller 230 and I/O module 200 are further coupled to a buffer memory 240 that enables the node 110 to temporarily store received data for particular calls routed through an output port 220. It is possible to use random access memory (RAM) for the buffer 240.

Although the communication links 120 are directly coupled to either input or output ports, it is possible for the links 120 to alternatively provide such coupling by employing switch networks between the links 120 and the ports 210 and 220 according to the invention. However, the particular arrangement used for coupling the ports 210 and 220 and the network links 120 are not critical to practicing the invention. For instance, nodes having ports that can transmit and receive information can alternatively be used with the invention. Also, demultiplexers 300 and/or multiplexers 310 can be connected between the respective input and output ports 210 and 220 and the links 120 to receive and transmit multiplexed packets as shown in the embodiment of the node 110 in FIG. 3. Similar components in FIGS. 2 and 3 are like numbered for clarity, for example, the controller 230 and the ports 210 and 220.

Figure 3:
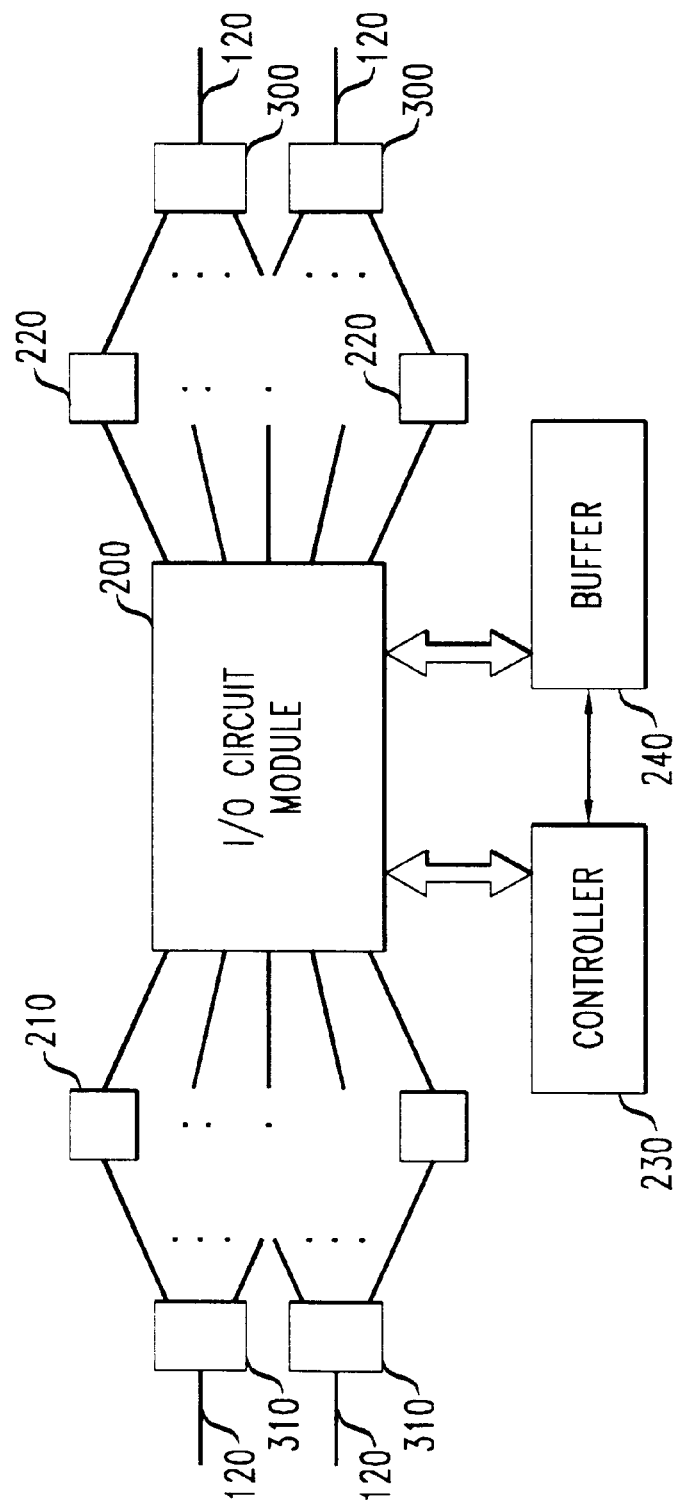
FIG. 3 illustrates a schematic block diagram of an alternative embodiment of the node of FIG. 2.

The node arrangement in FIG. 3 enables different packets received at one or more input ports 210 to be routed and multiplexed through output ports 220 onto a single network link 120. In a similar manner, this arrangement enables different packets received at a single input port 210 to be routed and demultiplexed through two or more output ports 220 onto respective network links 120. The multiplexing and demultiplexing of the packets transmitted and/or received over the links 120 can be performed, for example, based on a conventional round-robin technique, a weighted round-robin technique, or some other form of implementing a scheduling queue. Such multiplexing and demultiplexing techniques in data networks are described in greater detail in Schwartz, *Integrated Broadband Networks*, Ch. 5, pp. 181–242 (Prentice-Hall, New Jersey 1996), which is incorporated by reference. It is possible for the controller 230 to cause the router network 220 to route data to the respective link 120 in a multiplexed manner according to the invention without the use of a multiplexer circuit.

The use of the buffer 240 enables the node 110 to take advantage of permissible delays in conveying a packet to its destination based on a grade of service commitment by temporarily storing packets in a queue-like fashion received from an input port 210 and ultimately routed through an output port 220 while conveying other packets enabling a relatively high packet conveyance capacity for the node 110. The controller 210 also provides buffer management for the buffer 240. In accordance with the invention, the controller 210 employs a memory allotment technique that provides an the enhanced packet conveyance capacity for established VC's while maintaining grade of service commitments associated with such VC's.

Figure 4:
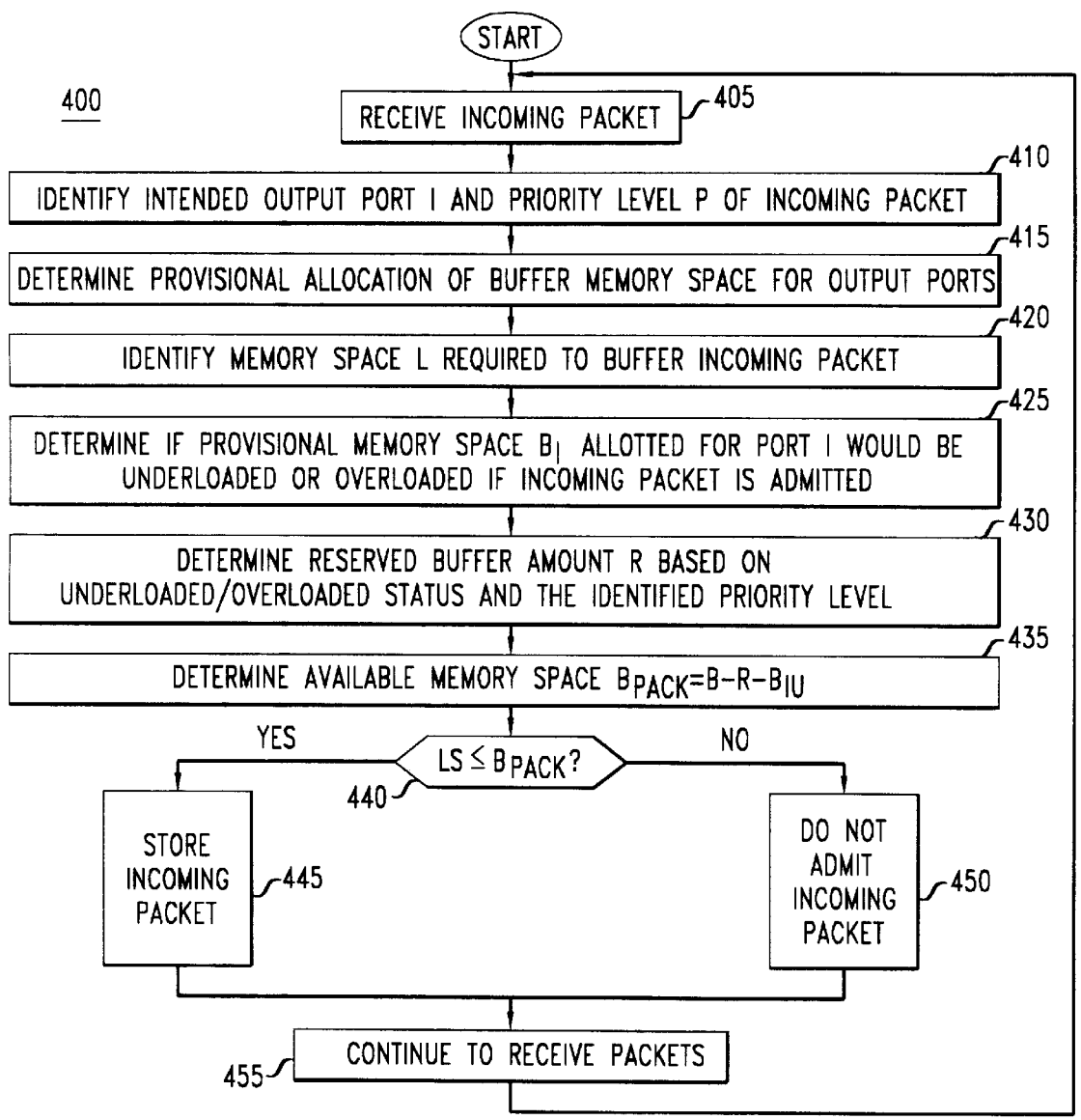
FIG. 4 illustrates a flow diagram of an exemplary embodiment of the invention operating in the network of FIG. 1.

An exemplary packet admission and buffer management method 400 for the nodes of FIGS. 2 and 3 in accordance with the invention is shown in FIG. 4. An incoming data packet is first received in step 405. Then, the priority level P and intended output port I of the incoming packet is determined in step 410. Provisional allotments of the total memory space B of the buffer memory 240 are then made for buffering packets intended for the respective output ports in step 415.

As used herein, the term "allotment" refers to the general allocation of an amount of memory space of the buffer 240 for buffering data packets for a VC which does not necessarily require a physical assignment of a specific memory region of the buffer 240, whether contiguous or otherwise, for such buffering. Accordingly, it is possible for the allotments to indicate that particular amount of the memory locations in the buffer 240 are intended for use in buffering packets for respective VC's and the output ports through which they are established. As previously stated, it is possible for more than one VC to be established through a single port.

The memory space allotments can advantageously be based on determined effective memory requirements for buffering packets of VC's established through the node 110. The effective memory requirement is the amount of buffer memory that is substantially required per unit time for conveying packets through the node for the particular VC. Various techniques can be employed for determining the effective memory requirement of a VC for use with the invention. The effective memory requirement for a VC through a multiport node can be determined in a substantially similar manner to that described in A. Elwalid, D. Mitra and R. Wentworth, "A New Approach for Allocating Buffers and Bandwidth to Heterogeneous, Regulated Traffic in an ATM Node," *IEEE J. on Selected Areas in Communications*, vol. 13, no. 6, pp. 111–527 (August 1995), which is incorporated by reference herein. Moreover, the provisional allotments need not be based on the effective memory requirements of the VC's according to the invention. It is possible to alternatively base such allotments on other estimates of the need for buffer traffic through such ports as well as general apportionment techniques.

Although step 415 is shown occurring after the priority level P and intended output port I are identified in step 410, such step need not be performed in such an order. It is also possible to update such allotment information intermittently, such as when VC's are created through the node 110 or when established VC's are terminated. Accordingly, the step 415 can be performed prior to, after or simultaneously with the other steps of the method 400.

After the provisional memory allotments are determined in step 415, the amount of memory space L required for the incoming packet is determined in step 420. The required memory space L for the incoming packet typically corresponds to the length of information bits of that packet. If a system employs packets of fixed length L then step 420 can be omitted from the method 400 according to the invention.

Then, in step 425, the method 400 determines if the provisionally allotted memory space $B_I$ for the intended output port I is underloaded or overloaded based on the memory space L required for the incoming packet. The provisional allotment is considered underloaded if the memory space L required for the incoming packet in combination with the memory space containing packets intended for conveyance through the output port I does not exceed the provisional memory space $B_I$ allotted for that port in step 415. Conversely, the provisional allotment is considered overloaded if the memory space L required for the incoming packet in combination with the memory space containing packets intended for conveyance through the output port I exceeds the provisional memory space $B_I$.

An amount of memory R that should be reserved and not used for the incoming packet is then determined in step 430 based on the underloaded or overloaded status from step 425 as well as the priority level of the incoming packet identified in step 410. The reserved memory R is the amount of the available memory that should be reserved for buffering current and/or future received packets for other output ports or priority levels than the port I or priority level of the present incoming packet under evaluation. The reserved memory amount R should be chosen so as to protect the buffer memory requirements for the other ports that are underloaded such that when those ports become more active and require buffer memory up to their provisional allotment, such memory space is made available in a timely manner.

The specific value for R should be chosen so as to permit admission and buffering of a large number of packets destined for respective ports experiencing high traffic, while substantially ensuring that packets destined for low traffic ports are not denied admission above a tolerable level. Typically, the value of the reserved memory amount R should be greater when the provisional memory allotment for the port I is overloaded than when the provisional memory allotment is underloaded. In a similar manner, the value of the reserved memory amount R should be greater for an incoming packet with a lower priority level than a packet with a higher priority level. Also, it can be advantageous to use a reserved memory amount R of zero for an incoming packet having the highest priority, alone or in combination with, an underloaded status.

Numerous methods can be used for determining the values used for the reserved memory amount R according to the invention for providing enhanced data packet buffering capacity while maintaining grades of service commitments for established VC's. Such methods include, for example, the use of empirically determined fixed values or the use of models for determining the value R based on the extent of overloading or underloading of the allotted memory. It is also possible for the choice of the numerical value for the reserved buffer amount R to be advantageously a monotonic increasing function based on the amount of underloadedness of an intended output port of the incoming packet. An exemplary method for determining the value R is described in greater detail below.

After the reserved memory amount R is determined in step 430, then the method determines the amount of shared memory space $B_{PACK}$ that is available for use by the incoming packet in step 435. The available memory space $B_{PACK}$ is the total shared memory space B less the reserved memory space R less the memory space in use $B_{IU}$ presently containing packets in the shared memory for conveyance through the ports ($B_{PACK}$=B−R−$B_{IU}$). Then, in step 440, if the memory space required for the incoming packet L is less than or equal to the available memory $B_{PACK}$, the method 400 proceeds to step 445 where the incoming packet is admitted and stored in the buffer 240 for later conveyance through the intended port I. Otherwise, the method 400 proceeds to step 450 and the incoming packet is not admitted to the node 110. Lastly, in step 455, the method 400 prepares to receive more packets by returning to step 405.

In this exemplary embodiment, the steps of the method 400 are shown in a particular order for ease of discussion purposes, however, it should be readily understood that such steps can be performed in various sequences or simultaneously according to the invention. Moreover, although this embodiment relies on the determination of the reserved memory space R based on the underloaded or overloaded status of the provisional memory allotted to the output port I as well as the priority level of the incoming packet, it is possible to base the reserved memory space R on the underloaded or overloaded status alone according to the invention.

Accordingly, since the invention examines the available memory space of the shared buffer memory as well as the space available of buffering packets for the respective output port in admitting packets, a relatively high node packet conveyance capacity can be attained substantially without disproportionately allotting memory space of the shared buffer to packets intended for one particular output port or priority level to the detriment of other packet types.

An incoming packet to the node 110 may advantageously be received by and the method 300 performed by a network processor (not shown) connected to every node in the network. In such a centralized system, the network processor has relatively accurate information about the current level of congestion at each node because the network processor monitors buffer memory use for established connection and the traffic levels on the links connected to each node. Alternatively, admission processing of the method 300 can be performed locally or in a decentralized manner. Decentralized systems tend to be more fault tolerant because no single network element makes all routing decisions. However, centralized systems tend to make routing determinations with the complete and current status of congestion levels at nodes in the network rather than based on information updated intermittently.

It is possible to determine the reserved memory amount R for use in step 430 of FIG. 4, in a manner such that if the provisionally allotted memory for a destination port is determined to be underloaded, a reserved memory amount R in the range of, for example, 0 to 0.02B can be used based on the priority of the data packet. Further, if the provisionally allotted memory for the destination port is determined overloaded, then the following expression can be used to determine the value R.

$$R = f\left[\sum_{i \in U} (Bi - Qi)\right],$$

where f [ ] is a function, i is a port index reference and U is the set of underloaded ports at an instant in time. The $$\sum_{i \in U} (Bi - Qi)$$

is a relative measure of the extent of underloadedness of the ports i in the set U and correspondingly, the extent of underloadedness of the node. It is advantageous for the function f [ ] to be slowly changing and monotonically increasing with respect to $$\sum_{i \in U} (Bi - Qi)$$

such as, for example, logarithmic functions including LOG[ ].

Also, it is possible to employ an arrangement that selects one of a plurality of fixed values in the overloaded condition, such as, for example, $R_1$, $R_2$ and $R_3$ for the reserved memory amount R. For instance, $R=R_1$, if $$\sum_{i \in U} (Bi - Qi)$$

is relatively large, such as on the order of greater than 80% of the provisionally allotted memory for underloaded ports $$\sum_{i \in U} Bi;$$

or $R_2$, if $$\sum_{i \in U} (Bi - Qi)$$

is relatively moderate, such as on the order of 20% to 80% of $$\sum_{i \in U} Bi;$$

or if $R_3$, if $$\sum_{i \in U} (Bi - Qi)$$

is relatively small, such as on the order of less than 20% of $$\sum_{i \in U} Bi.$$

It is important in such an arrangement, that the reserved memory values for R be in the relationship $R_1 > R_2 > R_3$. Exemplary values for $R_1$, $R_2$ and $R_3$ are 0.1B, 0.05B and 0.025B, respectively. It is also possible for the value R to be a constant for the overloaded condition which can typically be in the range of 0.1% to 5% of the total memory space B.

Although several embodiments of the invention have been described in detail above, many modifications can be made without departing from the teaching thereof. All of such modifications are intended to be encompassed within the following claims. For instance, it is possible to employ other techniques for determining the reserved memory amount R in accordance with invention, including fixed values depending on whether the provisionally allotted memory for the intended port is underloaded or overloaded, or such values can intermittently or on demand be determined based on the extent to which the provisionally allotted memory is overloaded or underloaded.

The invention claimed is:

1. A method for a node having a plurality of output ports and a shared buffer memory for buffering data packets to be conveyed through such ports comprising:

processing an incoming packet for conveyance through a particular one of said output ports for a network virtual circuit established through said particular port;

determining a provisional allotment of said memory for at least one of said ports;

determining if a memory requirement for said incoming packet would make said memory provisionally allotted for said particular port underloaded or overloaded based on packets buffered in said memory for conveyance through said particular port; and admitting or rejecting the incoming packet to the buffer memory based on whether said memory requirement for said packet is no greater than the amount of shared buffer memory not containing packets less a reserved memory amount, said reserved amount being a function of said underloaded or overloaded determination.

2. The method of claim 1 wherein said reserved memory amount is further a function of a priority level associated with said incoming packet.

3. The method of claim 2 wherein said priority level corresponds to a cell loss probability bit associated with said incoming packet.

4. The method of claim 2 wherein an unspecified priority level associated with said incoming packet is considered a lowest priority level.

5. The method of claim 2 wherein said reserved memory amount is greater when said incoming packet is of a lower priority compared to when said incoming packet is of a higher priority level.

6. The method of claim 1 wherein said determined provisional memory allotments are adjusted based on the establishment and termination of virtual circuits through said node.

7. The method of claim 1 wherein said determined provisional memory allotments are based on effective memory requirements of established virtual circuits.

8. The method of claim 1 wherein said reserved memory amount employed in said admitting or rejecting step is in the range of zero to an amount corresponding to the amount of shared buffer memory not containing packets.

9. The method of claim 1 wherein said reserved memory amount is greater when said provisional allocation of memory for said port is determined to be overloaded compared to underloaded.

10. The method of claim 1 wherein said step of processing includes processing asynchronous transfer mode cells as incoming packets.

11. A multi-port node for conveying packets of data for established virtual circuits through said node comprising:

an input-output circuit coupled to a plurality of ports for processing packets as incoming and outgoing packets, said input-output circuit for receiving an incoming packet on an input port and for transmitting outgoing packets through an output port;

a shared buffer memory for temporarily storing packets to be conveyed through said ports;

a controller configured for controlling said module to process the packets and allotting portions of said memory for the respective output ports by processing an incoming packet for conveyance through a particular one of said output ports, and determining a provisional allotment of said buffer memory for at least two of said ports and determining if a memory requirement for buffering said packets is not greater than an amount of shared buffer memory not containing packets less a reserved memory amounts, said reserve being a function of said underloaded or overloaded determination.

12. The node of claim 11 wherein said node processes packets of variable lengths.

13. The node of claim 11 wherein said node processes packets of fixed lengths.

14. The node of claim 11 wherein said packets are asynchronous transfer mode cells.

15. The node of claim 11 wherein said controller determines the provisional memory allotment based on effective memory requirements of established virtual circuits.

16. A method for a node having a plurality of output ports and a shared buffer memory for buffering data packets to be conveyed through such ports comprising:

processing an incoming packet for conveyance through a particular one of said output ports for a network virtual circuit established through said particular port;

determining a provisional allotment of said memory for at least one of said ports;

determining if a memory requirement for said incoming packet would make said memory provisionally allotted for said particularly port underloaded or overloaded based on packets buffered in said memory for conveyance through said particular port; and admitting or rejecting the incoming packet to the buffer memory based on whether said memory requirement for said packet is not greater than the amount of shared buffer memory not containing packets less a reserved memory amount, said reserved amount being a function of said underloaded or overloaded determination and of a priority level associated with said incoming packet, and wherein said reserved memory amount is greater when said incoming packet is of a lower priority compared to when said incoming packet is of a higher priority level.

* * * * *